Oct. 26, 1926.
J. G. CLEMENS
POWER CONVERTING DEVICE
Filed April 25, 1924
1,604,681
2 Sheets-Sheet 2
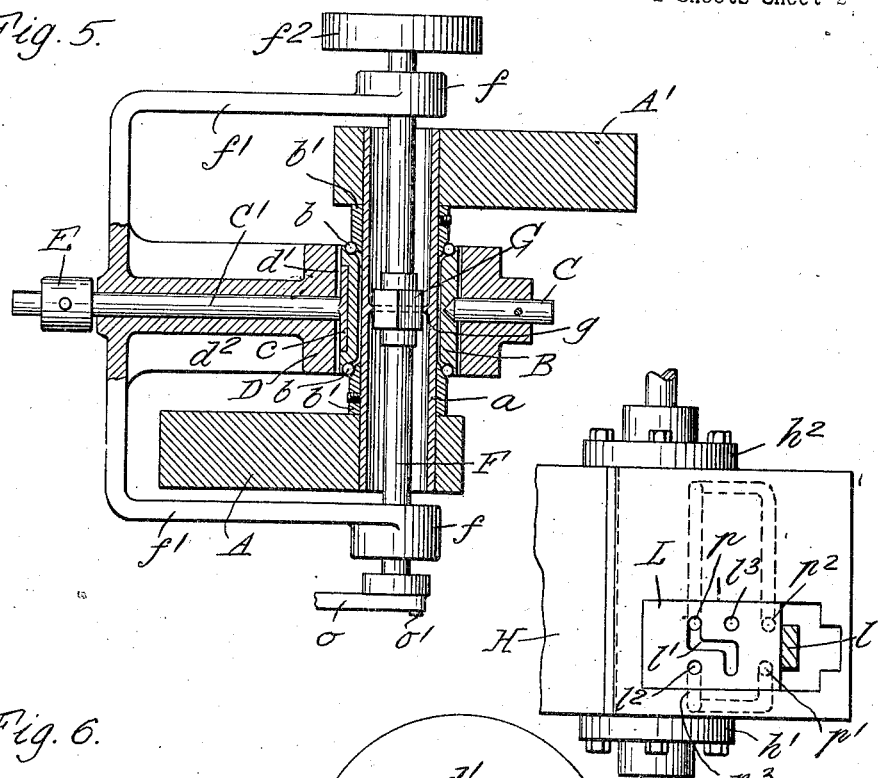
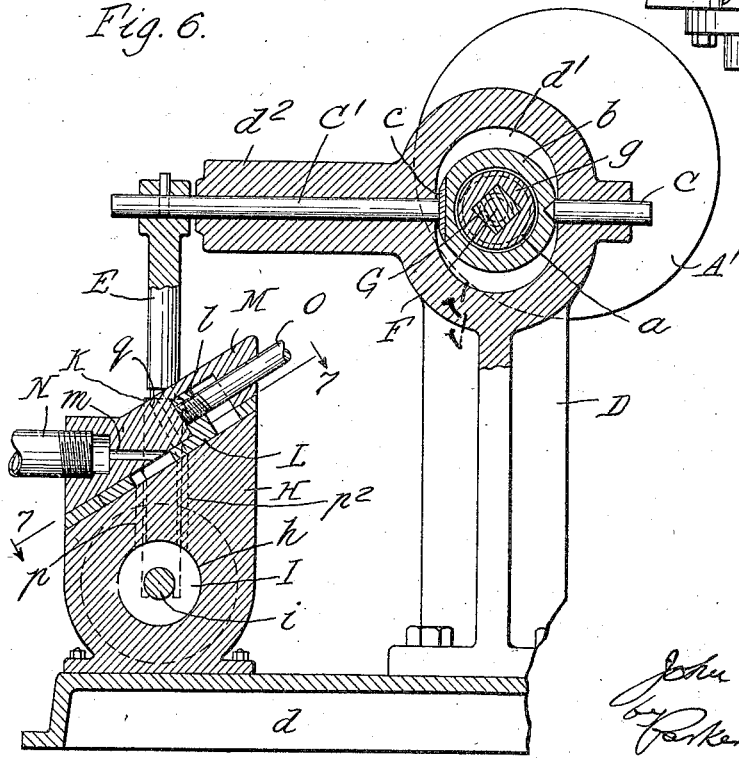
INVENTOR.
John G. Clemens
by Parker, Rockwood & Bean
ATTORNEYS.

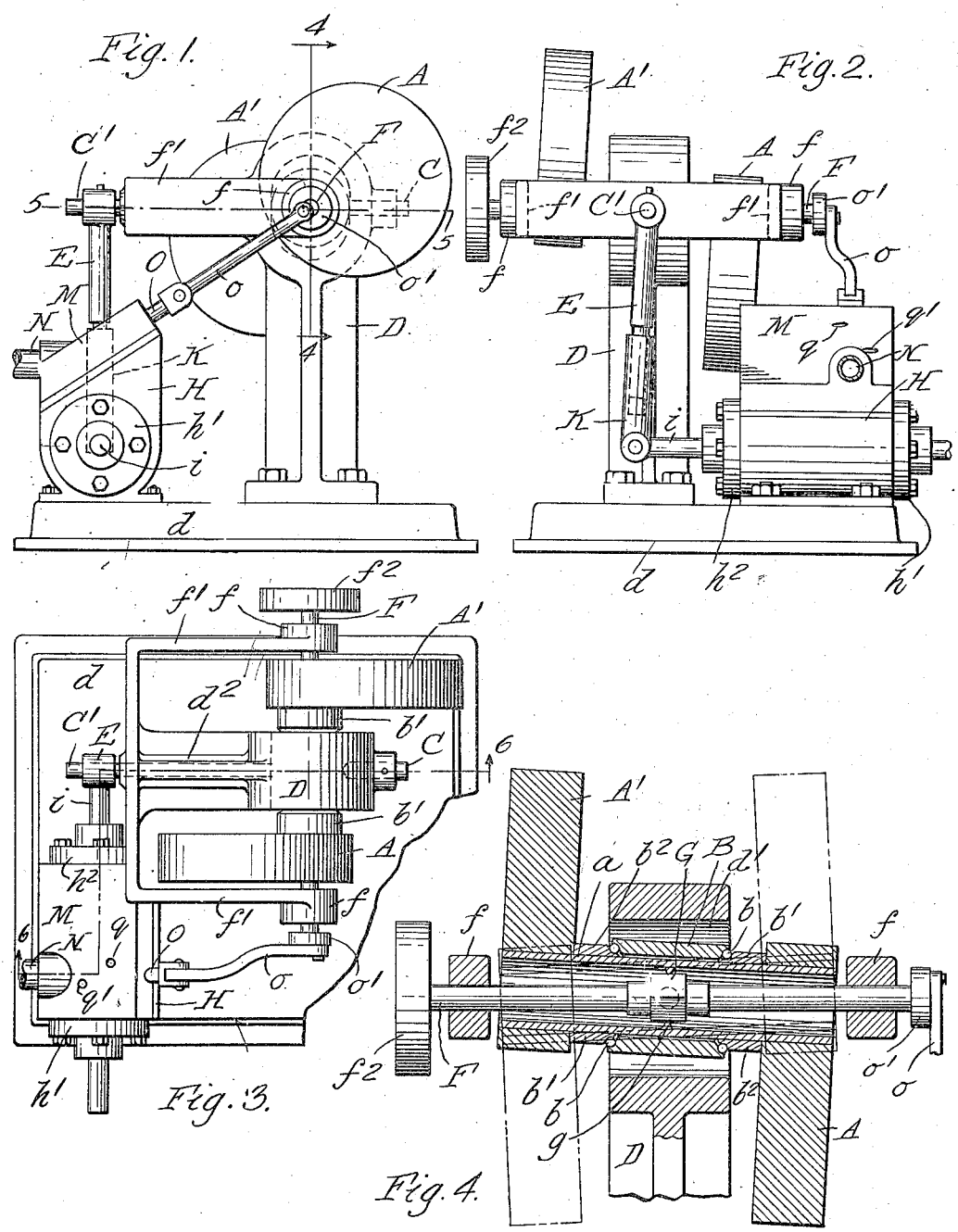

Patented Oct. 26, 1926.

1,604,681

UNITED STATES PATENT OFFICE.

JOHN G. CLEMENS, OF BUFFALO, NEW YORK.

POWER-CONVERTING DEVICE.

Application filed April 25, 1924. Serial No. 708,909.

This invention relates to devices or machines for converting power or energy of one form into power or energy of another form.

The objects of this invention are to provide a device which serves to change or convert power or energy of one form into power or energy of another form, and which is so constructed that it will automatically regulate the power or energy transmitted to the device in accordance with power or energy delivered by the device, within the limits of the capacity of the device; also to provide a device of this kind in which the conversion of power is effected by means of one or more eccentric weights so arranged that the weight or weights will oppose the transmission of more power to the device than is used by the device for delivering power in another form; also to provide a machine of this kind in which the revolving weighted members are so disposed with reference to their axis of rotation as to avoid vibration due to the eccentricity thereof; also to improve the construction of devices of this kind in the other respects hereinafter specified.

In the accompanying drawings:—

Fig. 1 is an end elevation of a device embodying this invention.

Fig. 2 is a side elevation thereof.

Fig. 3 is a top plan view thereof.

Fig. 4 is a fragmentary sectional elevation thereof on line 4—4, Fig. 1.

Fig. 5 is a fragmentary plan view thereof, partly in section on line 5—5, Fig. 1, on an enlarged scale.

Fig. 6 is a sectional elevation thereof on line 6—6, Fig. 3, on an enlarged scale.

Fig. 7 is a sectional view thereof on line 7—7, Fig. 6.

It is well known that if a weight is eccentrically arranged about a pivot and is started to revolve about the pivot, this rotary motion of the weight about the pivot may be maintained by reciprocating or otherwise changing the position of the pivot, if the reciprocations of the pivot are correctly timed with reference to the rotation of the weight, and also if the reciprocations are gradually retarded or accelerated, a corresponding retarding or accelerating of the rotation of the weight will result, and in my U. S. Patent No. 1,116,243, I have applied this principle to a mechanical movement whereby reciprocatory movement may be translated into rotary motion, or whereby rotary motion may be translated into reciprocatory motion. My present invention utilizes eccentric weights to convert power of one form into power of another form in such a manner that the weights will oppose the transmitting to the device of more power than the device can utilize.

It will be understood that the drawings illustrate merely one embodiment of my invention and that it is not intended to limit my invention to the particular embodiment shown.

As has been stated, the device may be operated with one or more eccentric weights or weighted members, and in the accompanying drawings two such weighted members are shown. These weighted members A and A' are mounted on a shaft $a$ in such a manner that the two weighted members extend in opposite directions with reference to the axis of the shaft so as to counterbalance each other, thereby avoiding vibrations which would be present in a machine using only one weight. The shaft $a$ is journalled to rotate in a bearing sleeve or member B, which in the construction shown is provided near its ends with ball bearings $b$ which also engage in ball races formed on sleeves $b'$ permanently secured on the shaft $a$ on which the eccentric weights are mounted. A bearing of any other kind may be employed, and it will, of course, be understood that the weighted members or weights A and A' may be of any other form, those shown being substantially disk shaped.

The outer bearing sleeve B is preferably arranged between the two weighted members and is mounted to swing or oscillate relatively to the frame of the machine in such a manner that when the bearing is oscillated the ends of the shaft $a$ will simultaneously move in opposite directions. In the particular construction shown for this purpose, the bearing sleeve B is provided at one side with a depression or recess into which a bearing pin C enters, the pin C being rigidly secured in an upright standard or part D of the frame of the machine, the standard D being mounted upon any suitable base $d$. The upper part of the standard D is provided with a vertically elongated hole or opening $d'$ through which the hollow shaft $a$ extends. The pin C is suitably secured in the upper portion of the standard D, and the opposite side of the bearing sleeve B is secured to an oscillatory rod C' which has a bearing in a horizontally extending arm $d^2$ of the standard D. The end of the oscillatory rod or stem C' may be secured to the outer bearing sleeve B in any suitable or desired manner.

In the particular construction shown, the inner end of the oscillatory stem C' is provided with an enlarged part $c$ which enters into a channeled portion of the bearing sleeve B, but it will be understood that the oscillatory stem C' may be otherwise secured to the bearing sleeve B. The oscillatory stem C' has an arm E rigidly secured to the outer end thereof, which may be oscillated to impart oscillatory movement to the stem C', which in turn imparts the oscillatory movement to the shaft $a$, producing an up and down movement of the outer ends of this shaft. Consequently when the weights are rotated, the weights may be kept in rotation, or may be accelerated by oscillating the arm E.

Means of any suitable kind may be provided for transmitting the motion of rotation of the shaft $a$, the axis of which oscillates during the operation of the machine, to a shaft or rotatable member having a fixed axis. In the particular construction shown for this purpose, the shaft is hollow, and F represents the shaft which extends into the hollow shaft or sleeve $a$, the shaft F being journalled in bearings $f$ formed on the ends of two rigid extensions or arms $f'$ which are formed integrally with the arm $d^2$ of the standard. The shaft F and the hollow shaft $a$ are connected by means of a coupling of any suitable construction. In the machine shown in the drawings, this coupling includes a square or non-circular part G rigidly secured on the intermediate part of the shaft F and which fits into a substantially square or non-circular hole formed in an inwardly projecting portion $g$ of the hollow shaft $a$, the projection $g$ being preferably arranged as near as possible in the axis about which the hollow shaft $a$ oscillates. By means of this coupling, the rotation of the shaft F is transmitted to the hollow shaft or sleeve $a$, or vice versa; the rotation of the sleeve $a$ is similarly transmitted to the shaft F, having its axis fixed. One end of the shaft F is provided with a pulley $f^2$ or any other suitable means, whereby motion of rotation may be imparted to the shaft F or received therefrom, depending upon whether the shaft F is used as the driving shaft of the machine or as a driven shaft.

The operation of the parts of the mechanism so far described is as follows:—

If power is transmitted to the pulley $f^2$, the rotation of the shaft F will be transmitted by the clutch or coupling G to the sleeve or hollow shaft $a$, causing the eccentric weights A and A' to revolve. The simultaneous downward swinging of one weight and upward swinging of the other weight will tend to cause the hollow shaft $a$ to tilt or oscillate in one direction, and after the completion of a half of a revolution, the simultaneous swinging of the weights in the opposite directions produces an oscillation of the hollow shaft $a$ in the opposite direction. These alternative oscillations are transmitted to the oscillatory rod or stem C', which is rigidly connected with the bearing member B, and from the rod C', the oscillations are transmitted to the arm E, where the oscillations may be utilized to perform any desired work, such for example, as operating the piston of a pump or compressor, or for doing any other work which requires reciprocatory or oscillatory movement. If on the other hand, the power is transmitted to the arm E by any reciprocatory device, such for example as a piston or other movable member, the oscillations of the arm E will be communicated to the oscillatory rod or stem C', and thence to the hollow shaft $a$. If the weights A and A' are started to revolve, the oscillations of the shaft C' will cause the ends of the hollow shaft $a$ to reciprocate or oscillate, thus imparting the movement of rotation to the eccentric weights A, A', and this rotary movement is imparted to the shaft F through the medium of the coupling G, which shaft may deliver power to the pulley $f^2$.

I have found that a mechanism organized in accordance with the principle embodied in the machine shown in the drawings has the property of absorbing power only in accordance with the amount of power delivered by the machine. For example, if the oscillatory arm E is moved by means of a piston actuated by a fluid, then if no power is taken from the pulley $f^2$, the revolving weights A and A' will oppose the movement or reciprocation of the piston to such an extent that the stroke of the piston is materially shortened, and consequently the amount of motive fluid required is greatly decreased. As soon as power is taken from the pulley $f^2$, the weights A and A' decrease their opposition to the movement of the oscillating arm E, so that the stroke of the piston is increased, which requires a greater amount of motive fluid. In this respect the operation of the mechanism is somewhat analogous to the operation of an electric motor, in which a greater amount of counter-electromotive force is generated when the motor is running idle than when it is loaded, and the counter-electromotive force controls the amount of power taken by the motor. The weights A and A' seem to develop a force or inertia which might be called a counter-motive force, which controls the amount of power which may be delivered to the machine, and which varies, depending upon the power taken from the machine.

The machine also has the peculiarity of not exceeding a definite speed of operation when a certain amount of power is applied to the oscillating arm E. For example, if this arm is acted upon by a piston operated by compressed air at a certain pressure, the rotation of the shaft F will not exceed a definite speed when the machine is running idle or when no power is delivered therefrom, so that no governor is required, the weights themselves having the action of a governor. I have also found that if the machine is operated by means of power transmitted through the pulley $f^2$, and the piston of an air compressor is connected to the end of the arm E, then for a definite speed of rotation of the shaft F, a definite maximum pressure will be developed by means of the compressor, and when the compressor is working against this maximum pressure, then further operation of the machine will not increase this pressure, since the weights will either cease to move the oscillating arm E or will move this arm only to such a slight degree as to develop no further pressure. Consequently, when used in this manner, the weights act as a governor or pressure controller for limiting the pressure which may be developed by a compressor or other machine, and also when the desired pressure has been attained, very little power is required to operate the machine against this maximum pressure, since the weights and hollow shaft $a$ will then be revolving about a substantially fixed axis, and the only power required by the machine will be such as is necessary to overcome the friction of the machine.

It will be obvious that the oscillatory arm E may be driven by any desired reciprocatory or oscillatory device, for example, by the core of a solenoid, by a piston actuated by a fluid under pressure, or by any other suitable reciprocatory device. In the particular construction shown, the oscillatory arm E is connected with a piston adapted to be acted upon by fluid under pressure to impart movement to the arm E and thus produce rotary motion of the shaft F through the medium of the weighted members. For this purpose, a casing or cylinder block H is provided which is suitably secured to the base $d$ of the machine, and which is provided with a bore $h$ forming a cylinder, in which a piston I reciprocates. The ends of the cylinder $h$ are closed by means of caps or cylinder heads $h'$ and $h^2$ which are suitably secured to the cylinder block H, and which are preferably provided with openings or bores through which a piston rod $i$ secured to the piston I extends. One end of the piston rod $i$ is pivotally connected with a sleeve member K into which the lower end of the oscillatory arm E extends. This sliding connection between the sleeve K and the oscillatory rod E compensates for a relative movement of these two parts lengthwise of each other during the reciprocatory movement of the piston rod $i$.

The control of the flow of fluid to opposite sides of the cylinder for actuating the piston may be effected by means of any suitable valve mechanism, that shown including a slide valve L which is arranged at the upper end of the cylinder block H, and which is in the form of a plate arranged in a space between the cylinder block H and a detachable part or cover M which is provided with an inlet passage $m$ for the motor fluid, the passage being connected by means of a pipe or tube N with a source of motor fluid. The valve L is provided with an upwardly extending arm or extension $l$ to which one end of a valve rod O is secured. The valve rod extends through a hole in the cover M, and the outer end thereof is connected by a link $o$ to a crank $d$ formed on the end of the shaft F. The valve L is provided with a substantially S-shaped slot or opening $l'$ forming an inlet port, and also with two holes $l^2$ and $l^3$ forming exhaust ports. The S-shaped port $l'$ is adapted to register in all positions of the valve with the inlet opening or port $m$ in the cap or cover of the cylinder block. One end of the inlet port $l'$, when the valve is in the position shown in Fig. 7, is adapted to register with a port $p$ leading to one end of the cylinder, and when the valve is in a position at the other end of its stroke, the other end of the inlet port $l'$ is adapted to register with a port $p'$ in the cylinder block H, leading to the other end of the cylinder. The exhaust port $l^2$ is adapted to register with an exhaust passage $p^2$ in the cylinder block leading to one end of the cylinder and to connect this passage with a port or discharge opening $q$ in the cap M, and when the valve is in its other position the exhaust port $l^2$ is adapted to register with a passage $p^3$ in the cylinder block connected with the opposite end of the cylinder, and to connect this passage with a port or discharge opening $q'$ in the cap M. Consequently, when the valve is in the position shown in Fig. 7, the inlet port $l'$ is connected by means of the port $p$ with one end of the cylinder so that motor fluid is transmitted thereto and at the same time the exhaust port $l^2$ is connected with the passage $p^3$ leading to the other end of the cylinder, and to the discharge opening $q'$, so that motor fluid from the other end of the cylinder is exhausted. When the valve is in the other end of its stroke, the condition is reversed. Thus it will be seen that by changing the position of the valve by means of the crank $o'$, reciprocation of the piston I in the cylinder is effected. Any other valve arrangement may be used for controlling the flow of motive fluid to and from the cylinder.

When motive fluid under pressure is admitted to the cylinder block by means of the pipe N, and the eccentric weights A and A' are started to revolve, the reciprocation of the piston I caused by the motive fluid will oscillate the arm E, and consequently also the hollow tube or shaft $a$, thus causing the movements of this hollow shaft to add impetus to the rotation of the weights A and A'. I have found that when the machine described is running idle, that is when no power is taken from the pulley $f^2$ the weights A and A' act to limit the movement of the piston I in the cylinder so that when the device is not loaded there is very little movement of the piston in the cylinder, the movement of the piston being opposed by the weights A and A'. As soon as power is taken from the pulley $f^2$, the movement of the piston increases so that additional power is supplied to the weights by increasing the movement of the hollow shaft or tube $a$. Consequently, the eccentric weights serve not only to conserve power by preventing the device which supplies oscillatory movement to the arm E from taking more power than is necessary to maintain the machine in motion, but the weights furthermore act to limit the speed at which the machine operates for a given pressure of motive fluid, so that no governor is needed on the machine, and if the load is suddenly taken off of the shaft F, the machine will not race but will only slightly increase its speed in accordance with the pressure of the motor fluid.

Similarly, if the machine shown in the drawings is driven by means of power supplied to the pulley $f^2$ or the shaft F, the piston I and cylinder will act as a compressor, and when the machine is used for this purpose, the eccentric weights will definitely limit the pressure which may be generated by means of the piston I, this pressure depending upon the speed of rotation of the shaft F. Consequently, if the machine is set to deliver a certain air pressure, such for example as 100 pounds, the machine may be left running indefinitely, and as long as the speed of the shaft F is not increased or decreased, a definite pressure of 100 pounds will be maintained, and after this pressure has been attained, the power required to operate the machine against this pressure will be practically only enough to overcome the frictional resistance of the moving parts.

The piston I and cylinder, together with the valve mechanism has been described as used for supplying power to the weighted members to cause the same to rotate, but it will be obvious that the same mechanism described may be used as a pump or compressor if the device is driven by power supplied to the shaft F.

I claim as my invention:

1. In a power converting device, the combination of a movable bearing, a weighted member rotatable in said bearing and arranged eccentrically with reference to the axis of said bearing, a part connected with said bearing and movable therewith, a member rotatable about a fixed axis and connected with said weighted member so that rotation of either member will be transmitted to the other member and a power member of variable stroke connected with said movable bearing.

2. A power converting device including a rotatable weighted member which is arranged eccentrically with reference to its axis of rotation, and the axis of rotation of which is movable in unison with the rotation of said member, means rotatable about a fixed axis and rotatably connected with said member, and reciprocatory power means of variable stroke movable with said axis.

3. A power converting device including a shaft, a pair of weighted members each arranged eccentrically with reference to said shaft and spaced apart, said members extending in opposite directions with reference to the axis of said shaft, means for pivotally supporting said shaft intermediate of said weighted members so that said weighted members may alternately tilt said shaft in opposite directions, and a member rotatable about a fixed axis and rotatably connected with said shaft at approximately said pivotal supporting means.

4. A power converting device including a rotatable shaft pivoted at an intermediate portion thereof, weighted members secured on said shaft at opposite sides of the pivoted part thereof, said members being arranged eccentrically with reference to the axis of said shaft and extending in opposite directions from said axis, said shaft being movable about said pivoted part so that the parts thereof supporting said weighted members move in opposite directions, and a second shaft rotatably connected with said first mentioned shaft substantially at the pivoted portion thereof.

5. A power converting device including a rotatable shaft having weighted members secured at opposite sides of the intermediate portion thereof, and extending in opposite directions from the axis thereof, the intermediate portion of said shaft being pivoted to permit the ends of said shaft to swing simultaneously in opposite directions about said pivoted intermediate portion, a member connected with said shaft to be oscillated by the swinging movement of said shaft and which may receive power from said shaft or transmit power to said shaft, and a member rotatable about a fixed axis and rotatably connected with said shaft and adapted to transmit power to said shaft or receive power from said shaft.

6. A power converting device including a rotatable shaft having weighted members secured at opposite sides of the intermediate portion thereof and extending in opposite directions from the axis thereof, the intermediate portion of said shaft being held to permit the ends of said shaft to move simultaneously in opposite directions, whereby said shaft may be moved to impart rotary motion to said weighted members or whereby the rotation of said weighted members may be used to move said shaft about the intermediate portion thereof, means rotatable about a fixed axis and connected with said shaft to rotate therewith, and means connected with said shaft to move with the axis thereof.

7. A power converting device including a shaft having a weighted member eccentrically mounted thereon, said shaft being mounted to permit the eccentricity of said weight to produce a reciprocatory motion of said shaft, a power device of variable stroke for imparting reciprocatory movement to said shaft to produce rotary motion of said weighted member on said shaft, and means rotatable about a fixed axis and connected with said weight for receiving rotary motion therefrom.

8. In a power converting device, the combination of a rotatable shaft, a bearing in which the intermediate portion of said shaft is journalled, means for pivotally supporting said bearing to permit said bearing and shaft to swing about said pivot, a pair of weighted members secured to said shaft at opposite sides of said pivot and eccentrically arranged thereon and extending in opposite directions from the axis thereof, a member rotatable about a fixed axis and connected with said shaft to rotate therewith, and means connected with said bearing and adapted to move therewith.

9. In a power converting device, the combination of a rotatable shaft, a bearing in which said shaft is journalled, a weighted member mounted on said shaft and arranged eccentrically thereon, power-operated reciprocatory means of variable stroke connected with said shaft to cause said shaft to oscillate, whereby said weighted member is caused to rotate an increase in the speed of oscillation of said shaft offering an increased resistance to the movement of said reciprocatory means, and a decrease in said speed reducing the resistance to the movement of said reciprocatory means, and means rotatable about a fixed axis connected with said shaft to rotate therewith.

10. In a power converting device, the combination of a rotatable shaft, a bearing in which said shaft is journalled, means for pivotally supporting said bearing to permit said bearing and said shaft to oscillate, a pair of eccentrically weighted members rigidly secured on said shaft at opposite sides of said bearing and extending in substantially opposite directions from the axis of said shaft, and power-operated oscillatory means for causing said bearing to oscillate for causing said weighted members to rotate, and means rotatable about a fixed axis and connected with said shaft to rotate therewith.

11. A power converting device including a pivoted weighted member arranged eccentrically with reference to its axis of rotation, a hollow shaft on which said eccentric member is secured, means for moving said hollow shaft to produce movement of said weight about its axis, and a shaft extending into said hollow shaft and rotatable about a fixed axis and connected with said weighted member to rotate therewith.

12. A power converting device including a pivoted weighted member arranged eccentrically with reference to its axis of rotation, a hollow shaft on which said eccentric member is secured, said hollow shaft being pivoted at a distance from said weighted member, means for moving said hollow shaft about its pivoted part to produce movement of said weight about its axis, and a shaft rotatable about a fixed axis and extending into said hollow shaft and having a driving connection with said hollow shaft approximately at the pivoted portion thereof.

13. A power converting device including a hollow shaft, a bearing for said shaft intermediate of the ends thereof, an eccentrically weighted member arranged on each side of said bearing and secured to said shaft, said two eccentrically weighted members extending in substantially opposite directions with reference to the axis of said shaft, means for oscillating the bearing of said shaft, and a shaft arranged within said hollow shaft and connected therewith, said last mentioned shaft being rotatable about a fixed axis.

JOHN G. CLEMENS.